US009485694B2

(12) United States Patent
Hosono et al.

(10) Patent No.: US 9,485,694 B2
(45) Date of Patent: Nov. 1, 2016

(54) RADIO ACCESS DEVICE AND HANDOVER METHOD

(75) Inventors: Hiroyuki Hosono, Tokyo (JP); Takeshi Okamoto, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 645 days.

(21) Appl. No.: 13/993,835

(22) PCT Filed: Dec. 8, 2011

(86) PCT No.: PCT/JP2011/078459
§ 371 (c)(1),
(2), (4) Date: Jun. 13, 2013

(87) PCT Pub. No.: WO2012/081501
PCT Pub. Date: Jun. 21, 2012

(65) Prior Publication Data
US 2013/0260767 A1    Oct. 3, 2013

(30) Foreign Application Priority Data
Dec. 16, 2010   (JP) .............................. 2010-280693

(51) Int. Cl.
*H04W 36/30* (2009.01)
*H04W 36/04* (2009.01)
*H04W 36/00* (2009.01)
(Continued)

(52) U.S. Cl.
CPC ......... *H04W 36/04* (2013.01); *H04W 36/0055* (2013.01); *H04W 84/045* (2013.01); *H04W 92/12* (2013.01)

(58) Field of Classification Search
None
See application file for complete search history.

(56) References Cited

U.S. PATENT DOCUMENTS

| 7,224,977 | B2 * | 5/2007 | Cavalli | H04W 36/0083 370/329 |
| 2005/0026616 | A1 * | 2/2005 | Cavalli | H04W 36/0083 455/436 |
| 2008/0268852 | A1 * | 10/2008 | Petrovic | H04W 36/10 455/442 |

(Continued)

FOREIGN PATENT DOCUMENTS

| JP | 2010-068451 A | 3/2010 |
| WO | 99/51051 A2 | 10/1999 |
| WO | 2009/132929 A1 | 11/2009 |

OTHER PUBLICATIONS

International Search Report issued in PCT/JP2011/078459 mailed on Jan. 10, 2012 (2 pages).

(Continued)

*Primary Examiner* — Vladimir Magloire
*Assistant Examiner* — Frank Donado
(74) *Attorney, Agent, or Firm* — Osha Liang LLP

(57) ABSTRACT

A radio access device includes a controller signal processing unit (RNSAP unit) that processes a signal exchanged with a radio network controller (RNC); and a switching center signal processing unit (RANAP unit) that processes a signal exchanged with a switching center. The RNSAP unit requests to establish a communication path between the radio access device and the RNC and a communication path between the RNC and a BTS by transmitting a request signal to the RNC. Subsequent to receiving an acknowledgement signal corresponding to the request signal from the RNC, the RANAP unit requests to establish a communication path between the switching center and the RNC. Subsequent to receiving, by the RANAP unit, an acknowledgement signal corresponding to the request signal from the switching center, a communication path between the radio access device and the UE is released.

3 Claims, 11 Drawing Sheets

(51) Int. Cl.
*H04W 84/04* (2009.01)
*H04W 92/12* (2009.01)

(56) References Cited

U.S. PATENT DOCUMENTS

2010/0093358 A1* 4/2010 Cheong ............. H04W 36/0055
455/444

OTHER PUBLICATIONS

Written Opinion of the International Searching Authority issued in PCT/JP2011/078459 mailed on Jan. 10, 2012 (3 pages).
3GPP TS 25.467 V8.0.0.; "3rd Generation Partnership Project; Technical Specification Group Radio Access Network; UTRAN architecture for 3G Home NodeB; Stage 2 (Release 8)"; Dec. 2008 (22 pages).

* cited by examiner

RADIO ACCESS DEVICE AND HANDOVER METHOD

TECHNICAL FIELD

The present invention relates to a radio access device and a handover method.

BACKGROUND ART

In a mobile communication system, a mobile station (Mobile Station: which is also referred to as User Equipment (UE)) can perform radio communication in an area which is covered by a base station (Base Station: BTS/BS). The area covered by the base station is referred to as a cell. The size of the cell may be large or small. For example, there are types of cells such as a macrocell, a microcell, a picocell, and a femtocell. In the present application, a cell that covers a relatively narrow area compared to that of the macrocell is referred to as the "femtocell."

FIG. 1 shows a conceptual diagram of an area where macrocells and femtocells coexist. User equipment (UE) can perform radio communication in both the macrocell and the femtocell, or in one of the macrocell and the femtocell. A base station of a femtocell is referred to as a "femto base station (a femto BTS)" or a "Home Node B (HNB)." A base station of a macrocell is referred to as a "macro base station (a macro BTS or simply a BTS)." In addition to a communication carrier and an operator, a general user can set up a femto BTS. By establishing a femtocell, a load to a macrocell can be reduced while expanding coverage to an area in which communications can be performed.

When the macrocell and the femtocell coexist, a handover may be performed between them. When a user moves from a macrocell to a femtocell, or when the user moves from the femtocell to the macrocell, in a method which has conventionally been defined, it may be required to pass through a switching center (MMS/xGSN), which is an upper layer node of a macro base station (BTS), a radio network controller (RNC), a Home Node B (HNB), and a Home Node B Gateway (HNB-GW). This type of a handover method has been disclosed in Non-Patent Document 1.

RELATED ART DOCUMENT

Non-Patent Document

3GPP TS 25.467: UTRAN architecture for 3G Home Node B (HNB)

SUMMARY OF THE INVENTION

Problem to be Solved by the Invention

As described above, for performing a handover between a macrocell and a femtocell, control signals are communicated through a core node (CN) such as a switching center (MME/xGSN). A problem is that the processing load of the core network (CN) becomes saturated, if, for each time of a handover, a control signal passes through the core node (CN). Moreover, it is concerned that a waiting time period (delay time period) for a user become longer, due to the passage through the core node.

The problem of the present invention is to reduce the processing load of the core node for performing mobility control for user equipment between the macrocell and the femtocell.

Means for Solving the Problem

A radio access device according to one embodiment is the radio access device that performs mobility control for causing user equipment to perform a handover to a macrocell, the user equipment being served by a femtocell, the radio access device including a controller signal processing unit that processes a controller signal exchanged with a radio network controller, the radio network controller being a first upper layer node of a macro base station of the macrocell; and a switching center signal processing unit that processes a switching center signal exchanged with a switching center, the switching center being a second upper layer node of the radio network controller, wherein the controller signal processing unit requests to establish a first communication path between the radio access device and the radio network controller and a second communication path between the radio network controller and the macro base station by transmitting a first request signal to the radio network controller, wherein, subsequent to the controller signal processing unit receiving a first acknowledgement signal corresponding to the first request signal from the radio network controller, the switching center signal processing unit requests to establish a third communication path between the switching center and the radio network controller by transmitting a second request signal to the switching center, and wherein, subsequent to the switching center processing unit receiving a second acknowledgement signal corresponding to the second request signal from the switching center, a fourth communication path between the radio access device and the switching center is released.

Effect of the Present Invention

According to one embodiment, the processing load of the core node can be reduced for performing the mobility control for the user equipment between the macrocell and the femtocell.

EMBODIMENTS FOR CARRYING OUT THE INVENTION

In an embodiment explained below, a controller signal processing unit (specifically, a radio network subsystem signal processing unit (an RNSAP unit) is disposed in any one of a Home Node B Gateway (HNB-GW) and a Home Node B (HNB), and thereby making the RNSAP unit perform communication (transmitting and receiving signals, communication) with a radio network controller (IP-RNC). By doing this, a load to a core node can be significantly reduced for performing mobility control between a macrocell and a femtocell. In the embodiment, since the radio access device (the HNB-GW or the HNB) includes the RNSAP unit, the radio network controller (IP-RNC) can continue processing of a handover, regardless of whether an entity with which information regarding a handover is exchanged is a neighboring radio network controller (IP-RNC) or a neighboring radio access device (an HNB-GW or an HNB).

The embodiment is explained from the following viewpoints.

1. A case where RNSAP functions are included in HNB-GW
   1.1 System architecture
   1.2 Outgoing sequence (subscriber line extension)
   1.3 Outgoing sequence (relocation)
   1.4 Incoming sequence (subscriber line extension)
   1.5 Incoming sequence (relocation)
2. Case where RNSAP functions are included in HNB
   2.1 System architecture
   2.2 Outgoing sequence (subscriber line extension)
   2.3 Outgoing sequence (relocation)
   2.4 Incoming sequence (subscriber line extension)
   2.5 Incoming sequence (relocation)

<1. A Case where RNSAP Functions are Included in HNB-GW>

<<1.1 System Architecture>>

Figure 1:
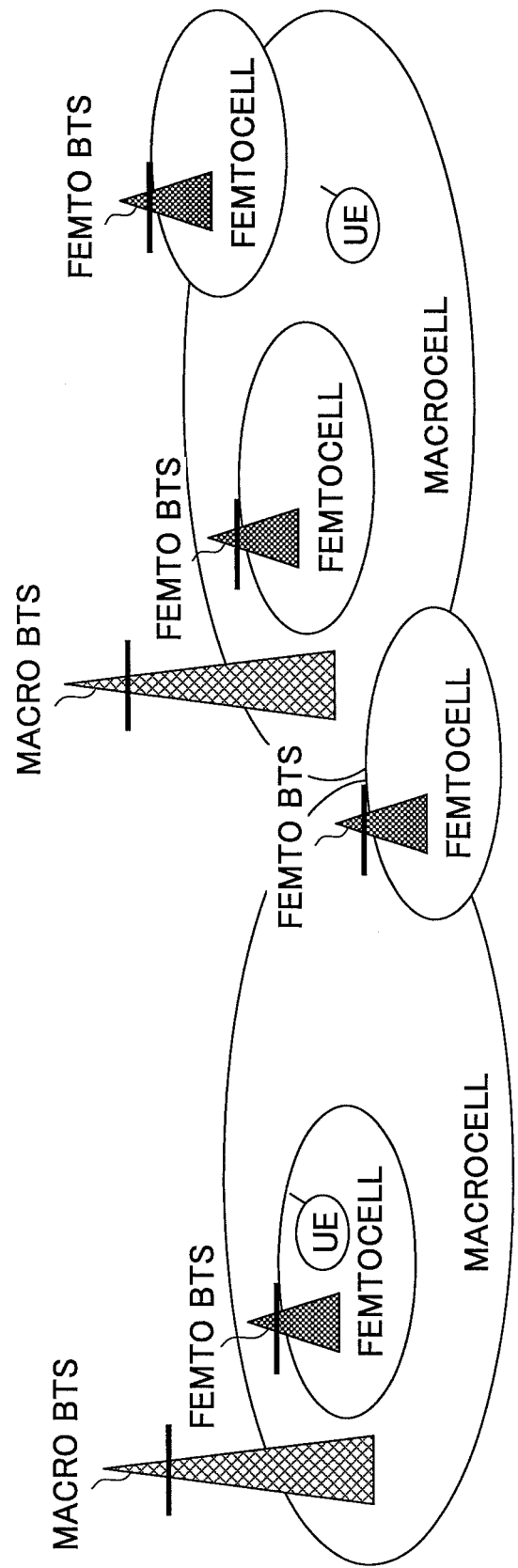
FIG. 1 is a diagram showing a state where femtocells and macrocells coexist.
Figure 2:
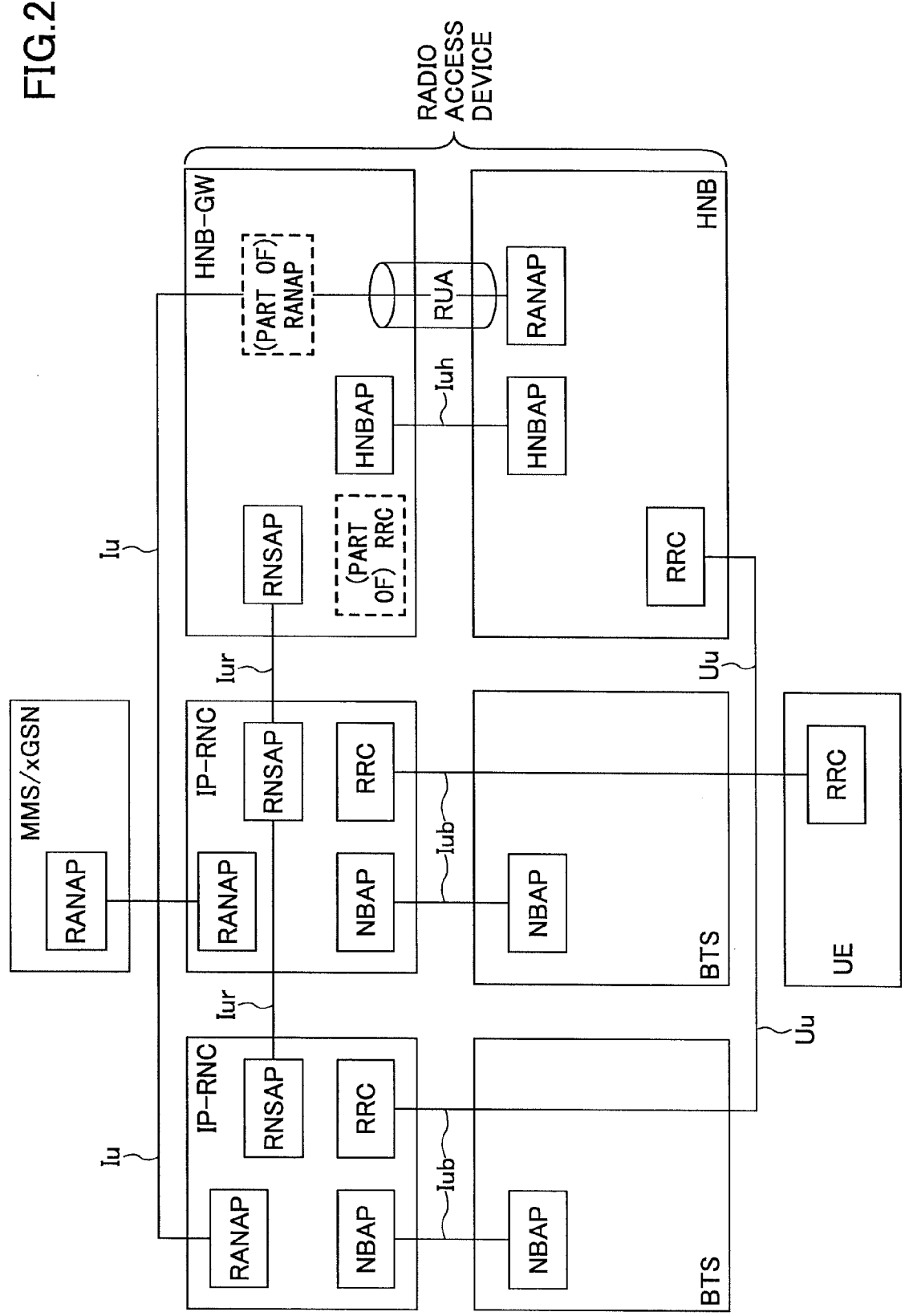
FIG. 2 is a diagram showing a system architecture used in an embodiment.

FIG. 2 shows a system architecture that is used in the embodiment. In FIG. 2, there are shown user equipment (UE); macro base stations (BTS); radio network controllers (IP-RNC); a switching center (MMS/xGSN); a Home Node B (HNB); and a Home Node B Gateway (HNB-GW). The example shown in the figure is depicted from a viewpoint of showing nodes that terminate corresponding protocols. The Base stations (BTS, HNB), the radio network controllers (IP-RNC), and the Home Node B Gateway (HNB-GW) are referred to as a radio access network (RAN) or a radio access device.

The user equipment (UE) can be any suitable communication terminal that can perform radio communication in a macrocell and in a femtocell. The user equipment, for example, is a mobile phone, an information terminal, a high-performance mobile phone, a smart phone, a personal digital assistant, and a mobile personal computer. However, the user equipment is not limited to these. The user equipment (UE) includes a radio resource control signal processing unit (RRC).

The macro base station (BTS) performs wireless communication with the user equipment (UE) being served in the corresponding macrocell. The macro base station (BTS) includes a base station signal processing unit (NBAP).

The radio network controller (IP-RNC) performs radio resource management and call processing. The radio network controller (IP-RNC) includes a Radio resource control signal processing unit (RRC); a base station signal processing unit (NBAP); a radio network subsystem signal processing unit (RNSAP); and a radio access network signal processing unit (RANAP).

The switching center (MMS/xGSN) performs processing of a core network of a mobile communication system. The switching center (MMS/xGSN) performs, for example, subscriber information management, mobility management, call origination control, call reception control, charging control, and QoS control. The switching center (MMS/xGSN) includes a radio access network signal processing unit (RANAP).

The Home Node B (HNB) performs wireless communication with user equipment (UE) being served in a femtocell. Unlike the macro base station (BTS), the Home Node B (HNB) performs radio resource management and call processing, for example. The Home Node B (HNB) includes a radio resource control signal processing unit (RRC); a Home Node B signal processing unit (HNBAP); and a radio access network signal processing unit (RANAP).

The Home Node B Gateway (HNB-GW) includes a Home Node B signal processing unit (HNBAP); a radio access network signal processing unit (RANAP); a radio network subsystem signal processing unit (RNSAP); and a radio resource control signal processing unit (RRC).

The interfaces between the user equipment (UE) and the macro base stations (BTSs) are indicated by "Uu." The interface between the user equipment (UE) and the femto base station (HNB) is also indicated by "Uu." The interfaces between the macro base stations (BTSs) and the corresponding radio network controllers (IP-RNCs) are indicated by "Iub." The interface between the radio network controllers (IP-RNCs) is indicated by "Iur." Additionally, the interface between the radio network controller (IP-RNC) and the Home Node B Gateway (HNB-GW) is indicated by "Iur." The interface between the Home Node B (HNB) and the Home Node B Gateway (HNB-GW) is indicated by "Iuh." The interfaces between the radio network controllers (IP-RNCs) and the switching center (MMS/xGSN) are indicated by "Iu." The interface between the Home Node B Gateway (HNB-GW) and the switching center (MMS/xGSN) is indicated by "Iu."

The radio resource control signal processing unit (RRC) included in the user equipment (UE), the radio network controllers (IP-RNCs), and the Home Node B (HNB), respectively, perform processing of RRC messages, which are exchanged through the interfaces "Uu." The processing of the RRC messages includes, at least, preparing, analyzing, transmitting, and receiving the RRC messages.

The base station signal processing units (NBAPs) included in the macro base stations (BTSs) and the radio network controllers (IP-RNCs), respectively, process signals, which are exchanged through the corresponding interfaces "Iub." The processing of the signals includes, at least, preparing, analyzing, transmitting, and receiving the signals.

The radio access network signal processing units (RANAPs) included in the radio network controllers (IP-RNCs), the Home Node B Gateway (HNB-GW), the Home Node B (HNB), and the switching center (MMS/xGSN), respectively, process signals, which are exchanged through the interfaces "Iu." The processing of the signals includes, at least preparing, analyzing, transmitting, and receiving the signals.

The Home Node B signal processing units (HNBAPs) included in the Home Node B (HNB) and the Home Node B Gateway (HNB-GW), respectively, process signals, which are exchanged through the interface "Iuh." The processing of the signals include, at least, preparing, analyzing, transmitting, and receiving the signal.

The radio network subsystem signal processing units (RNSAPs) included in the radio network controllers (IP-RNCs) and the Home Node B Gateway (HNB-GW), respectively, process signals, which are exchanged through the interfaces "Iur." The processing of the signals includes, at least, preparing, analyzing, transmitting, and receiving the signals. Note that, conventionally, the radio network subsystem signal processing unit (RNSAP) has not been included in the Home Node B Gateway (HNB-GW). In the embodiment, the problem that the processing load of the core node is increased can be overcome by including the radio network subsystem signal processing unit (RNSAP) in the Home Node B Gateway (HNB-GW).

<<1.2 Outgoing Sequence (Subscriber Line Extension)>>

Hereinafter, there is explained a handover method in the embodiment. Handovers between the macrocell and the femtocell are divided into outgoing handovers and incoming handovers. The outgoing handovers are for cases where a user (user equipment) being served in the femtocell moves to the macrocell. Whereas, the incoming handovers are for cases where a user (user equipment) being served in the macrocell moves to the femtocell. First, the outgoing handover is explained. Subsequently, the incoming handover is explained.

Figure 3:
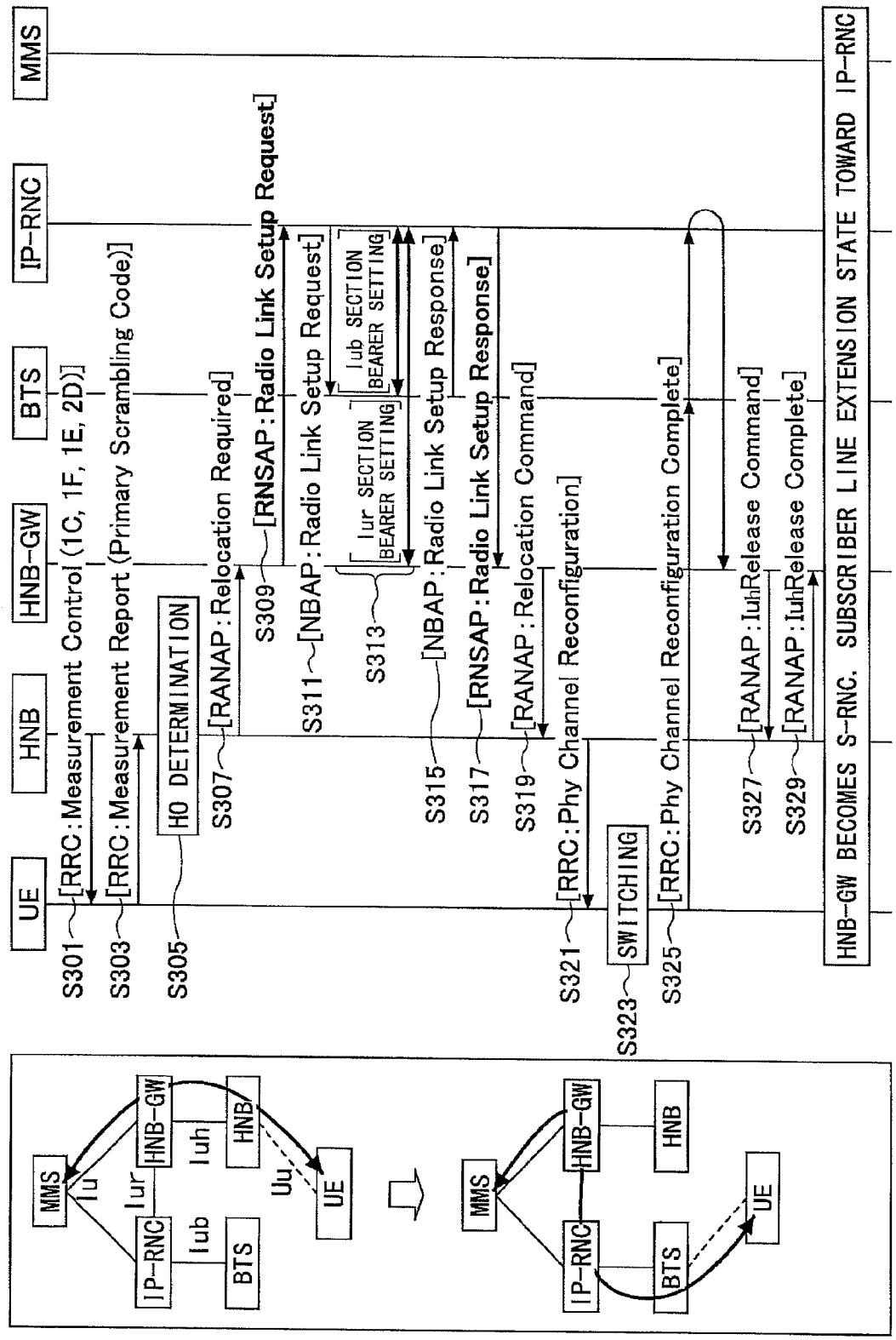
FIG. 3 is a diagram showing an operating sequence for performing an outgoing handover (a subscriber line extension)

FIG. 3 shows an operating sequence for performing an outgoing handover. The operating sequence shows operations, with which the user equipment (UE) being served in the femtocell is switched to the macrocell. The left hand side of the figure indicates how the communication paths are switched. The right hand side of the figure indicates the specific sequence.

At step S301, the Radio resource control signal processing unit (RRC) of the Home Node B (HNB) transmits a measurement command signal (Measurement Control (1C, 1F, 1E, and 2D)) to the user equipment (UE). Here, the "1C, 1F, 1E, and 2D" are parameters for specifying types of events, which are required to be reported. In response to the measurement command signal, the user equipment (UE) measures reception revels of the serving cell and the neighboring cells, and the user equipment (UE) determines whether some specified events occur.

At step S303, the radio resource control signal processing unit (RRC) of the user equipment (UE) transmits a report signal or a measurement report signal (Measurement Report (Primary Scrambling Code)) including a measurement result and a determination result to the Home Node B (HNB).

At step S305, the Home Node B (HNB) determines whether a handover is required. For convenience of the explanation, it is assumed that the handover be required.

At step S307, the radio access network signal processing unit (RANAP) of the Home Node B (NHB) transmits a request signal (Relocation Required) to start a handover process for relocation to the Home Node B Gateway (HNB-GW). The request signal includes, for example, an identifier of the user equipment, information regarding a target cell, and information about a type of communication (e.g., voice communication, data communication, or packet communication).

At step S309, the Radio network subsystem signal processing unit (RNSAP) of the Home Node B Gateway (MNB-GW) transmits a request signal (Radio Link Setup Request) to the radio network controller (IP-RNC). The request signal (Radio Link Setup Request) is for requesting to establish a communication path for the handover. The request signal includes, for example, information regarding radio resources (a radio code, a frequency, and transmission timing).

At step S311, the Base station signal processing unit (NBAP) of the radio network controller (IP-RNC) transmits a request signal (Radio Link Setup Request) to the macro base station (BTS). The request signal (Radio Link Setup Request) is for starting the handover process.

At step S313, bearers for an Iub section and an Iur section are established, and thereby establishing communication paths or logical paths for an Iub interface and an Iur interface.

At step S315, the base station signal processing unit (NBAP) of the macro base station (BTS) transmits an acknowledgement signal (Radio Link Setup Response) to the radio network controller (IP RNC). The acknowledgement signal (Radio Link Setup Response) indicates that the communication paths are established. The acknowledgement signal is for responding to the request signal at step S311.

At step S317, the radio network subsystem signal processing unit (RNSAP) of the radio network controller (IP-RNC) transmits a response signal (Radio Link Setup Response) to the Home Node B Gateway (HNB-GW). The response signal (Radio Link Setup Response) indicates that the establishment of the communication paths is completed.

At step S319, the radio access network signal processing unit (RANAP) of the Home Node B Gateway (HNB-GW) transmits a command signal (Relocation Command) for starting the handover process to the Home Node B (HNB).

At step S321, the radio resource control signal processing unit (RRC) of the Home Node B (HNB) transmits a command signal (Phy Channel Reconfiguration) to the user equipment (UE). The command signal (Phy Channel Reconfiguration) is for commanding the switching of the communication paths.

At step S323, the user equipment (UE) switches the communication paths. Specifically, the communication paths are established as shown in the lower-left part of FIG. 3.

At step S325, the radio resource control signal processing unit (RRC) of the user equipment (UE) transmits an acknowledgement signal (Phy Channel Reconfiguration Complete) to the macro base station (BTS). The acknowledgement signal (Phy Channel Reconfiguration Complete) indicates that the switching of the communication paths is completed. The acknowledgement signal arrives at the Home Node B Gateway (HNB-GW), after transparently passing through the macro base station (BTS) and the radio network controller (IP-RNC). In general, when a signal transparently passes through a communication node, the communication node transmits the received signal without terminating it.

At step S327, the radio access network signal processing unit (RANAP) of the Home Node B Gateway (HNB-GW) transmits a command signal (Iuh Release Command) to the Home Node B (HNB). The command signal (Iuh Release Command) is for commanding the release of the communication path of the Iuh section At step S329, the radio access network signal processing unit (RANAP) of the Home Node B (HNB) transmits an acknowledgement signal (Iuh Release Complete) to the Home Node B Gateway (HNB-GW). The acknowledgement signal (Iuh Release Complete) corresponds to the command signal By doing this, the communication path of the Iuh section is released, and the state shown in the lower-left part of FIG.

3 is achieved. The state shown in the figure is referred to as "the subscriber line extension," where the Home Node B Gateway (HNB-GW) remains as a serving node during the switching of the user equipment (UE) from the femtocell to the macrocell. When user equipment (UE) performs a handover while the user equipment (UE) is performing communication through a dedicated channel (DCH), the handover is performed by the subscriber line extension method, such as shown in the figure. For a case where the user equipment (UE), for example, further moves and enters a cell which is controlled by another radio network controller (IP-RNC), the communication paths of the radio network controller (IP-RNC) and the macro base station (BTS) are switched, and the state shown in the lower-left part of FIG. 3 is maintained.

<<1.3 Outgoing Sequence (Relocation)>>

Figure 4:
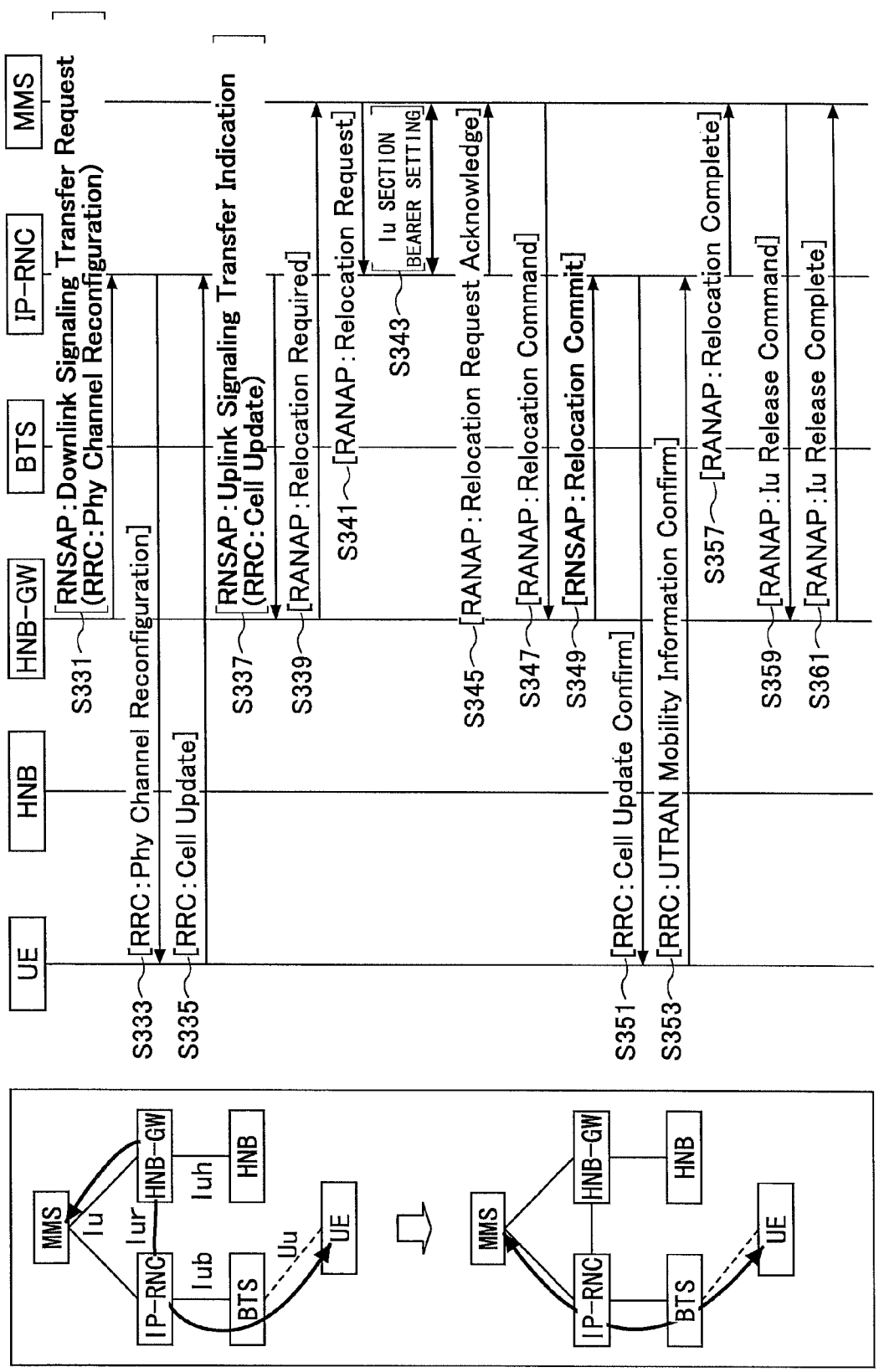
FIG. 4 is a diagram showing an operating sequence for performing an outgoing handover (relocation)

Referring to FIG. 4, there are explained operations for a case (the case of relocation) where the communication paths of the switching center are switched from the state of the subscriber line extension.

At step S331, the radio network subsystem signal processing unit (RNSAP) of the Home Node B Gateway (HNB-GW) transmits a transfer signal (Downlink Signaling Transfer Request) to the radio network controller (IP-RNC). The transfer signal (Downlink Signaling Transfer Request) includes an RRC message. The RRC message is to be reported to the user equipment (UE). The transfer signal arrives at the user equipment (UE), after passing through the radio network controller (IP-RNC) and the macro base station (BTS) (step S333). The RRC message included in the transfer signal includes, for example, information regarding the relocation (e.g., a radio code, a frequency, and timing), which is for transferring the control from the Home Node B Gateway (HNB-GW) to the radio network controller (IP-RNC).

At step S335, the radio resource control signal processing unit (RRC) of the user equipment (UE) transmits an acknowledgement signal (Cell Update) corresponding to the RRC message, which is for changing the setting. The acknowledgement signal arrives at the radio network controller (IP-RNC) through the macro base station (BTS).

At step S337, the radio network subsystem signal processing unit (RNSAP) of the radio network controller (IP-RNC) transmits a transfer signal (Uplink Signaling Transfer Indication) including the received acknowledgement signal to the Home Node B Gateway (HNB-GW). The transfer signal includes, for example, information regarding a content of the acknowledgement, which indicates that switching to a new channel is completed.

At step S339, the Radio Access Network Application Part (RANAP) of the Home Node B Gateway (HNB-GW) transmits a request signal (Relocation Required) to the switching center (MMS/xGSN). The request signal (Relocation Required) is for requesting relocation. The request signal includes, for example, information regarding the radio resources (e.g., a radio code, a frequency, and timing).

At step S341, the radio access network signal processing unit (RANAP) of the switching center (MMS/xGSN) transmits a request signal (Relocation Request) to the radio network controller (IP-RNC). The request signal (Relocation Request) is for requesting the relocation.

At step S343, a bearer for the Iu section is established, and a communication path or a logical path is established by the Iu interface.

At step S345, the radio access network signal processing unit (RANAP) of the radio network controller (IP-RNC) transmits an acknowledgement signal (Relocation Request Acknowledge) to the switching center (MMS/xGSN). The acknowledgement signal (Relocation Request Acknowledge) corresponds to the request signal of the relocation.

At step S347, the radio access network signal processing unit (RANAP) of the switching center transmits a request signal (Relocation Command) to the Home Node B Gateway (HNB-GW). The request signal (Relocation Command) is for actually transferring the control. The request signal includes, for example, acknowledgment information, which indicates that the relocation to the IP-RNC is completed.

At step S349, the radio network subsystem signal processing unit (RNSAP) of the Home Node B Gateway (HNB-GW) transmits a control signal (Relocation Commit) to the radio network controller (IP-RNC). The control signal (Relocation Commit) indicates that the relocation is performed.

At step S351, the radio resource control signal processing unit (RRC) of the radio network controller (IP-RNC) transmits an acknowledgement signal (Cell Update Confirm) to the user equipment (UE). The acknowledgement signal (Cell Update Confirm) corresponds to the RRC message for the change of the setting of the communication paths.

At step S353, the radio resource control signal processing unit (RRC) of the user equipment (UE) transmits an acknowledgement signal (UTRAN Mobility Information Confirm) to the radio network controller (IP-RNC). The acknowledgement signal (UTRAN Mobility Information Confirm) corresponds to the change of the setting of the communication paths.

At step S357, the radio access network signal processing unit (RANAP) of the radio network controller (IP-RNC) transmits a control signal (Relocation Complete) to the switching center (MMS/xGSN). The control signal (Relocation Complete) indicates that the relocation is completed.

At step S359, the radio access network signal processing unit (RANAP) of the switching center (MMS/xGSN) transmits a command signal (Iu Release Command) to the Home Node B Gateway (HNB-GW). The command signal (Iu Release Command) is for commanding the release of the communication path for the Iu section.

At step S361, the radio access network signal processing unit (RANAP) of the Home Node B Gateway (HNB-GW) transmits an acknowledgement signal (Iu Release Complete) to the switching center (MMS/xGSN). The acknowledgement signal (Iu Release Complete) corresponds to the command signal.

By doing this, the state shown in the lower-left part of FIG. 4 is achieved.

Unlike the conventional case, in the embodiment, the radio network subsystem signal processing units (RNSAPs) exchange communication signals (S309, S317, S331, S337, and S347) between the Home Node B Gateway (HNB-GW) and the radio network controller (IP-RNC), in FIGS. 3 and 4. With this, the number of times of communicating with the switching center (MMS/xGSN) can be minimized during a handover.

<<1.4 Incoming Sequence (Subscriber Line Extension)>>

Figure 5:
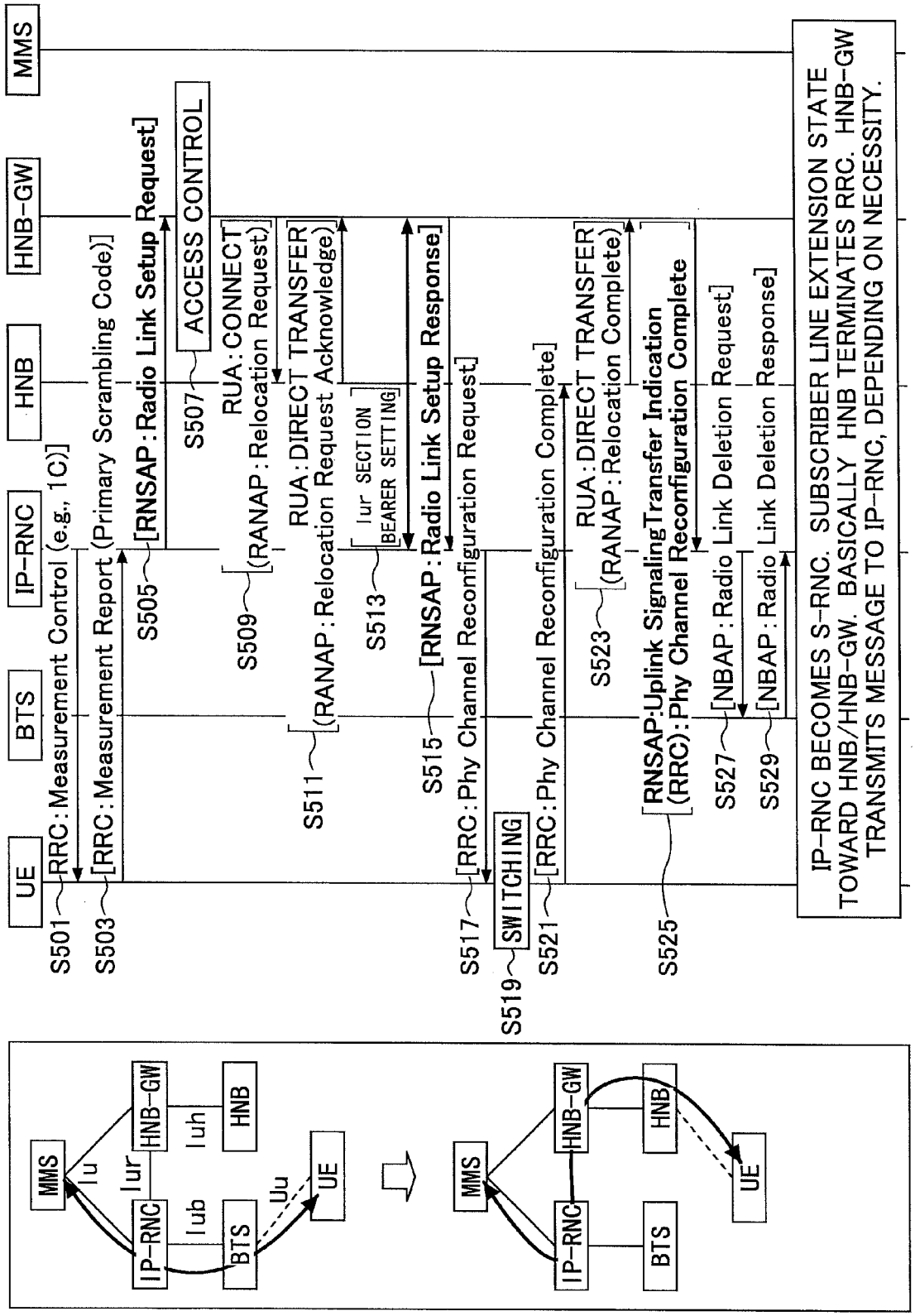
FIG. 5 is a diagram showing an operating sequence for performing an incoming handover (the subscriber line extension)

FIG. 5 shows an operating sequence for performing an incoming handover. The operating sequence shows operations, with which the user equipment (UE) being served in the macrocell moves to the femtocell. The left side of the figure shows how the communication paths are switched. The right side of the figure shows the specific sequence.

At step S501, the radio resource control signal processing unit (RRC) of the macro base station (BTS) transmits a measurement command signal (Measurement Control (e.g., 1C)) to the user equipment (UE). In response to the measurement command signal, the user equipment (UE) measures reception levels of the serving cell and the neighboring cells, and the user equipment (UE) determines whether a specified event occurs.

At step S503, the radio resource control signal processing unit (RRC) of the user equipment (UE) transmits a report signal or a measurement report signal (Measurement Report (Primary Scrambling Code)) including the result of the measurement and the result of the determination to the radio network controller (IP-RNC).

At step S505, the radio network subsystem signal processing unit (RNSAP) of the radio network controller (IP-RNC) transmits a request signal (Radio Link Setup Request) to the Home Node B Gateway (HNB-GW). The request signal (Radio Link Setup Request) is for requesting the setting of the communication paths for a handover. The request signal includes, for example, information regarding the radio resources (e.g., a radio code, a frequency, and timing).

At step S507, the Home Node B Gateway (HNB-GW) determines whether the user equipment (UE) is allowed to communicate in the femtocell. Specifically, the determination of whether the user equipment (UE) is allowed or not may be made by referring to a closed subscriber group (CSG) list. For convenience of the explanation, it is assumed that the user equipment (UE) be allowed to communicate in the femtocell.

At step S509, the radio access network signal processing unit (RANAP) of the Home Node B Gateway (HNB-GW) transmits a request signal (Relocation Request) to the Home Node B (HNB). The request signal (Relocation Request) is for starting a handover process for the relocation.

At step S511, the radio access network signal processing unit (RANAP) of the Home Node B (HNB) transmits an acknowledgement signal (Relocation Request Acknowledge) to the Home Node B Gateway (HNB-GW). The acknowledgement signal (Relocation Request Acknowledge) corresponds to the request signal.

At step S513, a bearer for the Iur section is established, and thereby a communication path or a logical path is established for the Iur interface.

At step S515, the radio network subsystem signal processing unit (RNSAP) of the Home Node B Gateway (HNB-GW) transmits an acknowledgement signal (Radio Link Setup Response) to the radio network controller (IP-RNC). The acknowledgment signal (Radio Link Setup Response) indicates that the setting of the communication paths is completed.

At step S517, the radio resource control signal processing unit (RRC) of the radio network controller (IP-RNC) transmits a command signal (Phy Channel Reconfiguration) to the user equipment (UE). The command signal (Phy Channel Reconfiguration) is for commanding to switch the communication paths.

At step S519, the user equipment (UE) switches the communication paths. Specifically, as shown in the lower-left part of FIG. 5, a radio link with the femto base station (HNB) is established.

At step S521, the radio resource control signal processing unit (RRC) of the user equipment (UE) transmits an acknowledgement signal (Phy Channel Reconfiguration Complete) to the Home Node B (HNB). The acknowledgement signal (Phy Channel Reconfiguration Complete) indicates that the switching of the communication paths is completed.

Home Node B (HNB) transmits an acknowledgement signal (Relocation Complete) to the Home Node B Gateway (HNB-GW). The acknowledgement signal (Relocation Complete) indicates that the switching of the communication paths is completed.

At step S525, the radio network subsystem signal processing unit (RNSAP) of the Home Node B Gateway (HNB-GW) transmits a transfer signal (Uplink Signaling Transfer Indicator) to the radio network controller (IP-RNC). The transfer signal (Uplink Signaling Transfer Indicator) includes an RRC message.

At step S527, the base station signal processing unit (NBAP) of the radio network controller (IP-RNC) transmits a command signal (Radio link Deletion Request) to the macro base station (BTS). The command signal (Radio Link Deletion Request) is for commanding to release the communication path of the Iub section.

At step S529, the base station signal processing unit (NBAP) of the macro base station (BTS) transmits an acknowledgement signal (Radio Link Deletion Response) to the radio network controller (IP-RNC). The acknowledgement signal (Radio Link Deletion Response) corresponds to the command signal.

By doing this, the communication path of the Iub section is released, and the state shown in the lower-left part of FIG. 5 is achieved.

Here, the Home Node B (HNB) terminates the RRC message (FIG. 2). It may not be necessary for the Home Node B (HNB) to transmit the acknowledgement signal at step S523 to the Home Node B Gateway (HNB-GW), after receiving the acknowledgement signal (RRC message) from the user equipment (UE). However, for the case of the embodiment, the radio network controller (IP-RNC) transmits the command signal (RRC message) at step S517, and the radio network controller (IP-RNC) waits for the acknowledgement signal corresponding to the command signal. When the acknowledgement signal is received, the subsequent process (the process of releasing the Iub section) can be started. However, when the acknowledgement signal is not received, the subsequent process cannot be started. Thus, at step S523, the Home Node B (HNB) transmits the signal which is equivalent to the acknowledgement signal to the Home Node B Gateway (HNB-GW), and at step S525, the Home Node B Gateway (HNB-GW) reports the acknowledgement signal to the radio network controller (IP-RNC). Accordingly, for the radio network controller (IP-RNC), the transfer signal (Uplink Signaling Transfer Indication) at step S525 is recognized as if the RRC message (which is the acknowledgement signal) were transmitted from the user equipment (UE). Consequently, the radio network controller (IP-RNC) can start the process of step S527, which is the next process. In order to perform these processes, the Home Node B Gateway (HNB-GW) includes the radio access network signal processing unit (RANAP) and the radio resource control signal processing unit (RRC) (which are "(part of) RRC" and "(part of) RANAP" indicated by corresponding dashed lines in FIG. 2). The radio access network signal processing unit (RANAP) is for step S523. The radio resource control signal processing unit (RRC) is for step S525.

<<1.5 Incoming Sequence (Relocation)>>

Figure 6:
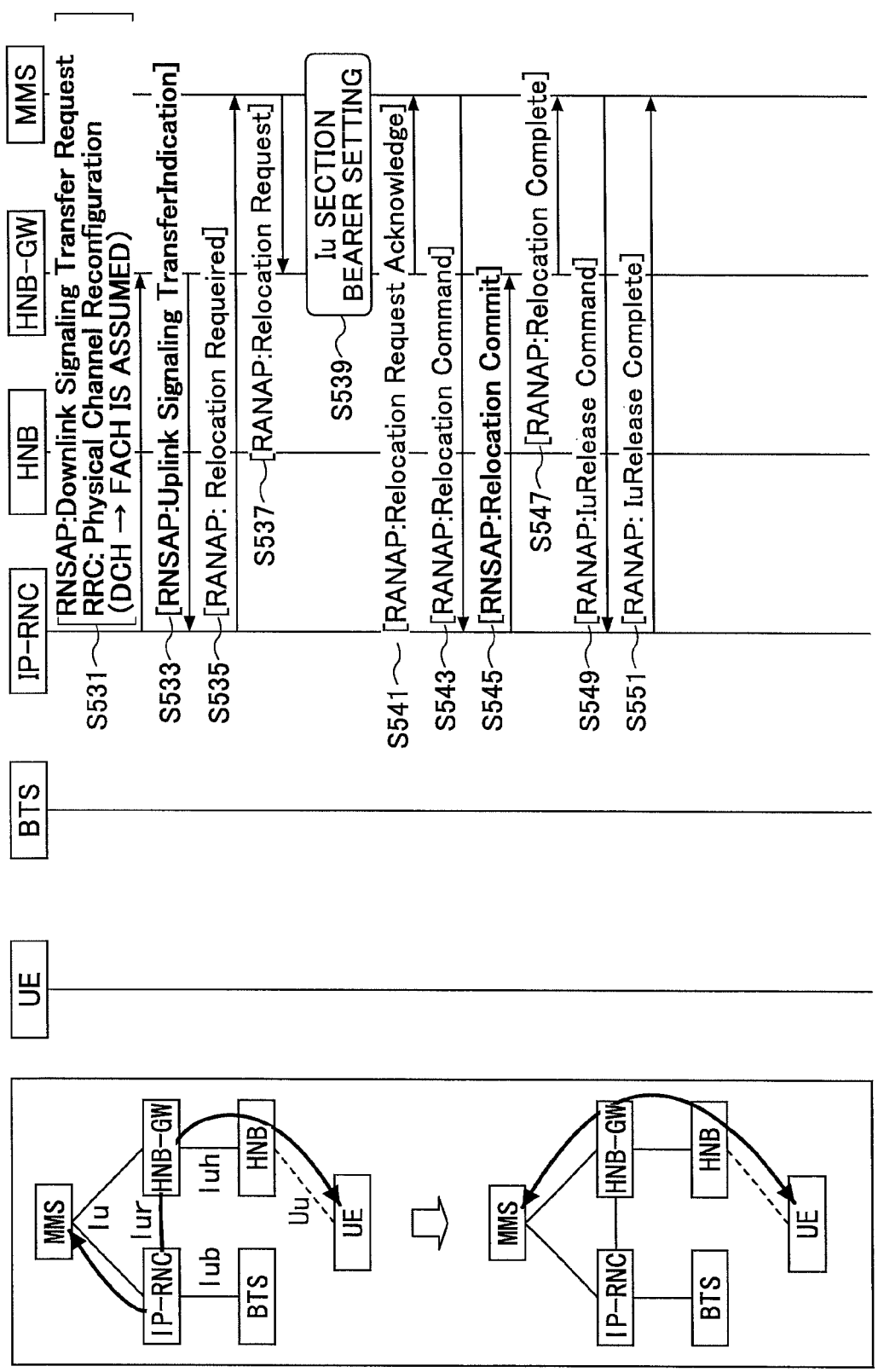
FIG. 6 is a diagram showing an operating sequence for performing an incoming handover (relocation)

Referring to FIG. 6, there are explained operations for a case (a case of relocation) where the communication paths to the switching center are switched from the state of the subscriber line extension.

When an existing radio network controller (IP-RNC) performs a handover for a user being in a state where a dedicated channel is allocated (DCH state), communication paths are switched by the subscriber line extension method.

During the DCH state, the relocation is not performed. During the relocation, serving nodes are switched. Such relocation is performed for a user being in a state where a shared channel is used (FACH state). At steps S531 and S533, processes are performed, which are for pretending as if there were switching from the DCH state to the FACH state.

At step S531, the radio network subsystem signal processing unit (RNSAP) of the radio network controller (IP-RNC) transmits a transfer signal (Downlink Signaling Transfer Request) to the Home Node B (HNB). The transfer signal (Downlink Signaling Transfer Request) includes an RRC message. The RRC message indicates that the managing state of the user equipment (UE) is switched from the DCH state to the FACH state.

At step S533, the radio network subsystem signal processing unit (RNSAP) of the Home Node B Gateway (HNB-GW) transmits a transfer signal (Uplink Signaling Transfer Indication) to the radio network controller (IP-RNC). The transfer signal (Uplink Signaling Transfer Indication) includes an acknowledgement signal. In this manner, the process of the relocation can be started, without changing the conventional processing method in the radio network controller (IP-RNC).

At step S535, the radio access network signal processing unit (RANAP) of the radio network controller (IP-RNC) transmits a request signal (Relocation Required) to the switching center (MMS/xGSN). The request signal (Relocation Required) is for requesting the relocation.

At step S537, the radio access network signal processing unit (RANAP) of the switching center (MMS/xGSN) transmits a request signal (Relocation Request) to the Home Node B Gateway (HNB-GW). The request signal (Relocation Request) is for requesting the relocation.

At step S539, a bearer for the Iu section is established, and thereby a communication path or a logical path is established for the Iu interface.

At step S541, the radio access network signal processing unit (RANAP) of the Home Node B Gateway (HNB-GW) transmits an acknowledgement signal (Relocation Request Acknowledge) to the switching center (MMS/xGSN). The acknowledgement signal (Relocation Request Acknowledge) corresponds to the request signal of the relocation.

At step S543, the radio access network signal processing unit (RANAP) of the switching center transmits a request signal (Relocation Command) to the radio network controller (IP-RNC). The request signal (Relocation Command) is for actually transferring the control. The request signal includes, for example, acknowledgement information indicating that the preparation of the relocation to the HNB-GW is completed.

At step S545, the radio network subsystem signal processing unit (RNSAP) of the radio network controller (IP-RNC) transmits a control signal (Relocation Commit) to the Home Node B Gateway (HNB-GW). The control signal (Relocation Commit) indicates that the relocation is performed.

At step S547, the radio access network signal processing unit (RANAP) of the Home Node B Gateway (HNB-GW) transmits a control signal (Relocation Complete) to the switching center (MMS/xGSN). The control signal (Relocation Complete) indicates that the relocation is completed.

At step S549, the radio access network signal processing unit (RANAP) of the switching center (MMS/xGSN) transmits a command signal (Iu Release Command) to the radio network controller (IP-RNC). The command signal (Iu Release Command) is for commanding the release of the communication path of the Iu section.

At step S551, the radio access network signal processing unit (RANAP) of the radio network controller (IP-RNC) transmits an acknowledgement signal (Iu Release Complete) to the switching center (MMS/xGSN). The acknowledgement signal (Iu Release Complete) corresponds to the command signal.

By doing this, the state shown in the lower-left part of FIG. 6 is achieved.

<2. Case where RNSAP Functions are Included in HNB>
<<2.1 System Architecture>>

Figure 7:
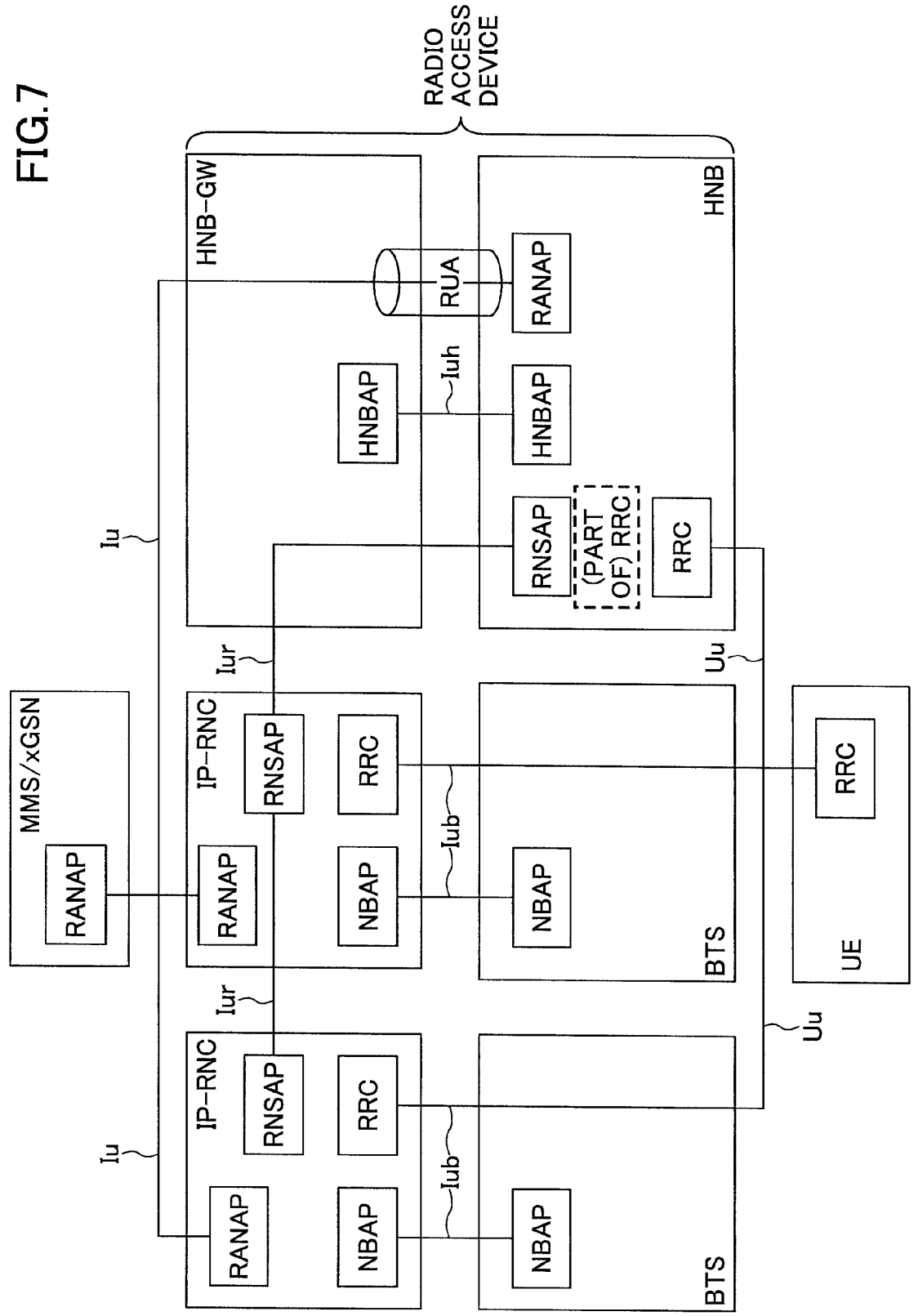
FIG. 7 is a diagram showing a system architecture used in a modified example.

FIG. 7 shows a system architecture, which is used in a modified example. Generally, it is the same as that of shown in FIG. 2. However, it is different in the following points.

In FIG. 2, the radio network subsystem signal processing unit (RNSAP) is included in the Home Node B Gateway (HNB-GW). Whereas, in FIG. 7, the radio network subsystem signal processing unit (RNSAP) is included in the Home Node B (HNB).

In FIG. 2, the radio access network signal processing unit (RANAP) is included in the Home Node B Gateway (HNB-GW). Whereas, in FIG. 7, the radio access network signal processing unit (RANAP) is not included in the Home Node B Gateway (HNB-GW).

<<2.2 Outgoing Sequence (Subscriber Line Extension)>>

Figure 8:
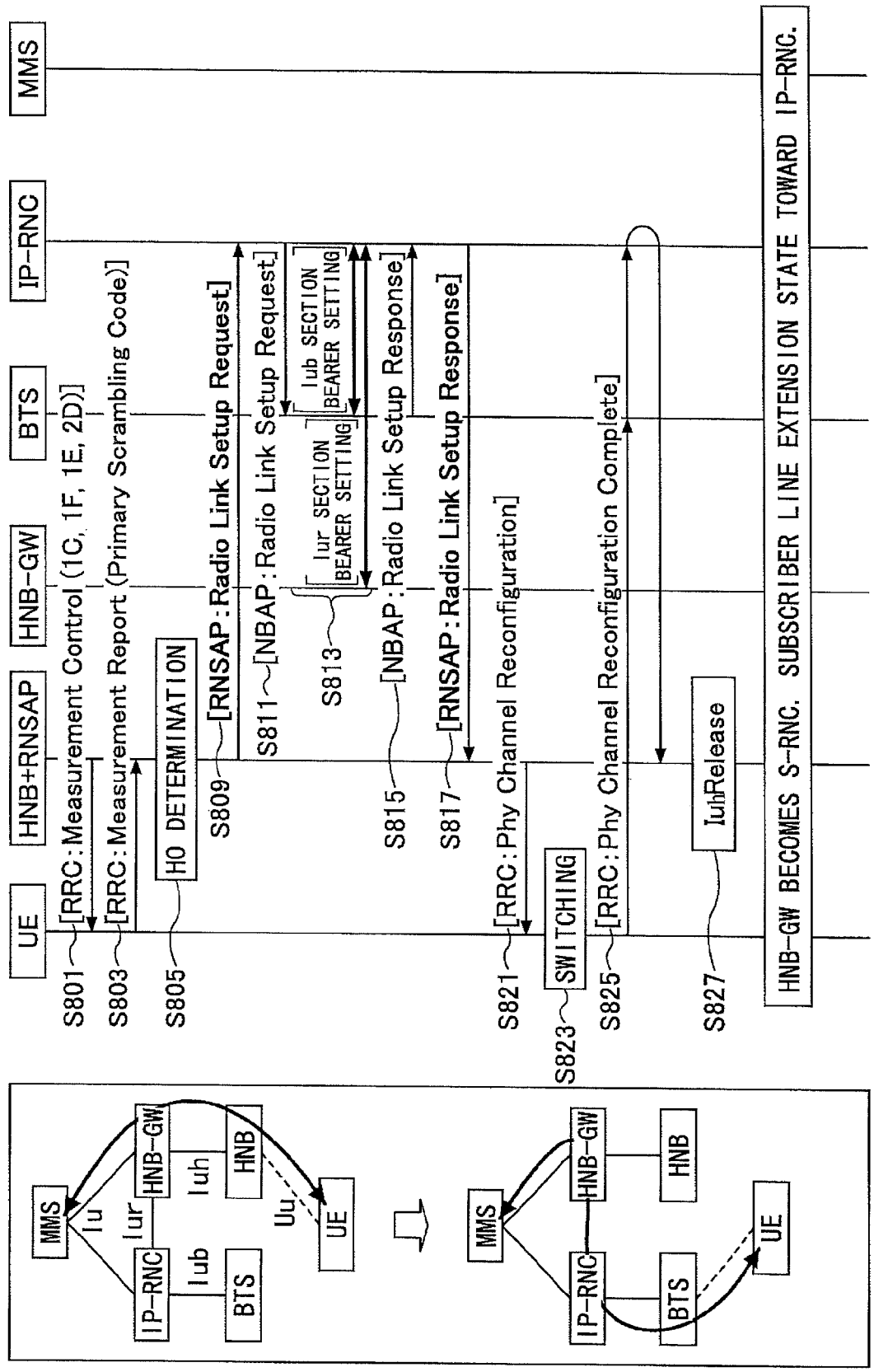
FIG. 8 is a diagram showing an operating sequence for performing the outgoing handover (the subscriber line extension)

FIG. 8 shows an operating sequence for performing an outgoing handover. The operating sequence shows operations, with which the user equipment (UE) being served in the femtocell is switched to the macrocell. The left hand side of the figure shows how the communication paths are switched. The right hand side of the figure shows the specific sequence. The operations shown in FIG. 8 are, in general, the same as those of FIG. 3. Steps S3xx of FIG. 3 correspond to steps S8xx of FIG. 8.

At steps S801 and 803, the Home Node B (HNB) transmits a measurement command signal (Measurement Control (1C, 1F, 1E, and 2D)) to the user equipment (UE). In response to the measurement command signal, the user equipment (UE) transmits a report signal or a measurement report signal (Measurement Report (Primary Scrambling Code) to the Home Node B (HNB).

At step S805, the Home Node B (HNB) determines whether a handover is required.

At step S809, the radio network subsystem signal processing unit (RNSAP) of the Home Node B (HNB) transmits a request signal (Radio Link Setup Request) to the radio network controller (IP-RNC). The request signal (Radio Link Setup Request) is for requesting to establish communication paths for a handover.

At step S811, the base station signal processing unit (NBAP) of the radio network controller (IP-RNC) transmits a request signal (Radio Link Setup Request) to the macro base station (BTS). The request signal (Radio Link Setup Request) is for starting the processing of the handover.

At step S813, bearers for the Iub section and the Iur section are established, and thereby the communication paths or the logical paths for the Iub interface and the Iur interface are established.

At step S815, the base station signal processing unit (NBAP) of the macro base station (BTS) transmits an acknowledgement signal (Radio Link Setup Response) to the radio network controller (IP-RNC). The acknowledgement signal (Radio Link Setup Response) indicates that the setting of the communication paths is completed.

At step S817, the radio network subsystem signal processing unit (RNSAP) of the radio network controller (IP- RNC) transmits an acknowledgement signal (Radio Link Setup Response) to the Home Node B (HNB). The acknowledgement signal (Radio Link Setup Response) indicates that the setting of the communication paths is completed.

At step S821, the radio resource control signal processing unit (RRC) of the Home Node B (HNB) transmits a command signal (Phy Channel Reconfiguration) to the user equipment (UE). The command signal (Phy Channel Reconfiguration) is for commanding to switch the communication path.

At step S823, the user equipment (UE) switches the communication path.

At step S825, the radio resource control signal processing unit (RRC) of the user equipment (UE) transmits an acknowledgement signal (Phy Channel Reconfiguration Complete) to the macro base station (BTS). The acknowledgement signal (Phy Channel Reconfiguration Complete) indicates that the switching of the communication path is completed. The acknowledgement signal arrives at the Home Node B Gateway (HNB-GW), after transparently passing through the macro base station (BTS) and the radio network controller (IP-RNC).

At step S827, the Home Node B (HNB) releases the communication path for the Iuh section.

<<2.3 Outgoing Sequence (Relocation)>>

Figure 9:
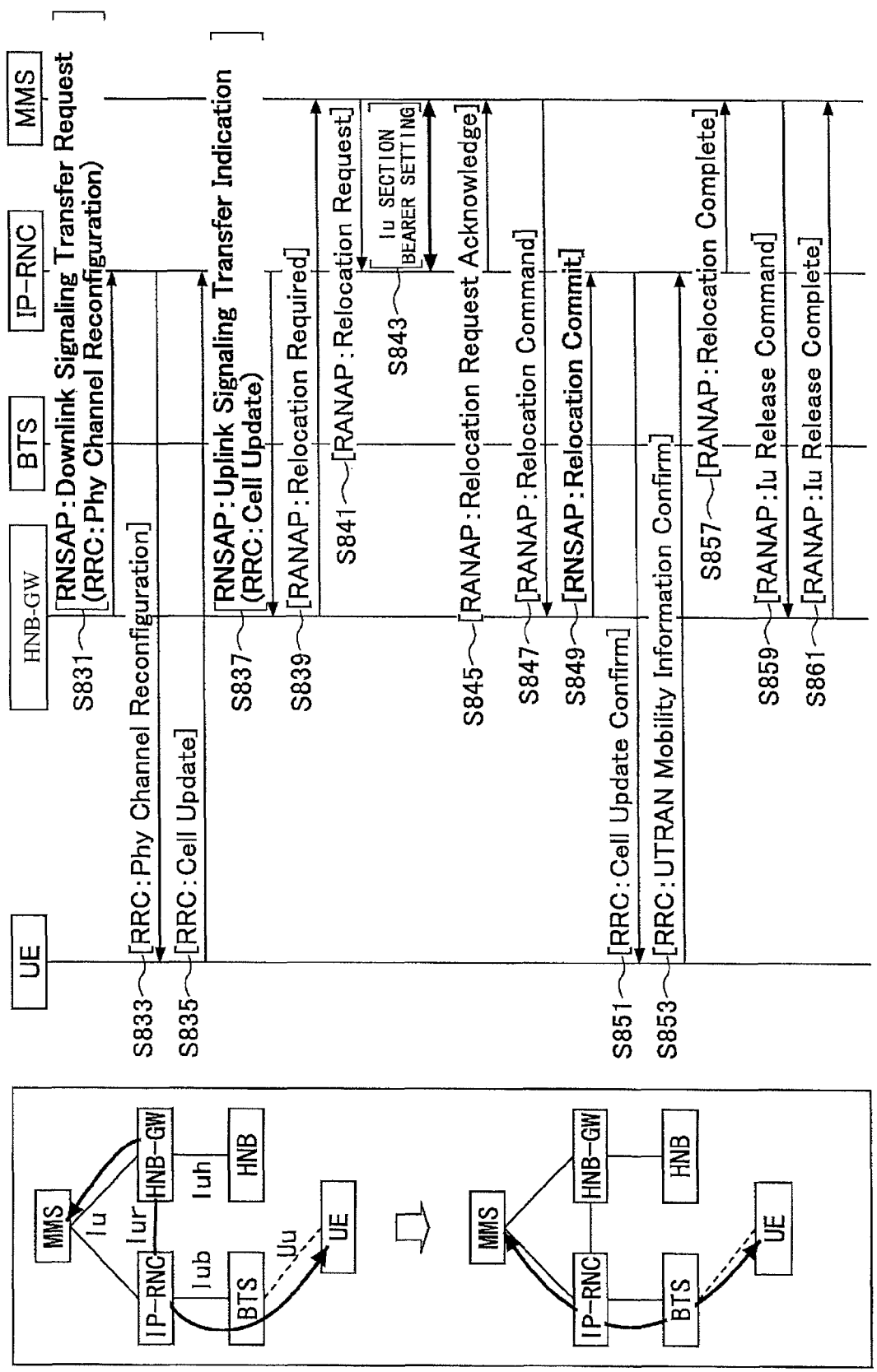
FIG. 9 is a diagram showing an operating sequence for performing the outgoing handover (the relocation)

Referring to FIG. 9, there are explained operations for a case (a case of the relocation) where the communication paths to the switching center are switched from the state of the subscriber line extension. Generally, the operations to be explained are the same as those of FIG. 4. Steps S3xx of FIG. 4 correspond to steps S8xx of FIG. 8.

At step S831, the radio network subsystem signal processing unit (RNSAP) of the Home Node B Gateway (HNB-GW) transmits a transfer signal (Downlink Signaling Transfer Request) to the radio network controller (IP-RNC). The transfer signal (Downlink Signaling Transfer Request) includes an RRC message to be reported to the user equipment (UE). The transfer signal arrives at the user equipment (UE), after transparently passing through the radio network controller (IP-RNC) and the macro base station (BTS) (step S833).

At step S835, the radio resource control signal processing unit (RRC) of the user equipment (UE) transmits an acknowledgement signal (Cell Update). The acknowledgement signal (Cell Update) corresponds to the RRC message of the change of the setting.

At step S837, the radio network subsystem signal processing unit (RNSAP) of the radio network controller (IP-RNC) transmits a transfer signal (Uplink Signaling Transfer Indication) to the Home Node B Gateway (HNB-GW). The transfer signal includes the received acknowledgement signal.

Home Node B Gateway (HNB-GW) transmits a request signal (Relocation Required) to the switching center (MMS/xGSN). The request signal (Relocation Required) is for requesting the relocation.

At step S841, the radio access network signal processing unit (RANAP) of the switching center (MMS/xGSN) transmits a request signal (Relocation Request) to the radio network controller (IP-RNC). The request signal (Relocation Request) is for requesting the relocation.

At step S843, the bearer for the Iu section is established, and the communication path or the logical path for the Iu interface is established.

At step S845, the radio access network signal processing unit (RANAP) of the radio network controller (IP-RNC) transmits an acknowledgement signal (Relocation Request Acknowledge) to the switching center (MMS/xGSN). The acknowledgement signal (Relocation Request Acknowledge) corresponds to the request signal of the relocation.

At step S847, the radio access network signal processing unit (RANAP) of the switching center transmits a request signal (Relocation Command) to the Home Node B Gateway (HNB-GW). The request signal (Relocation Command) is for actually transferring the control.

At step S849, the radio network subsystem signal processing unit (RNSAP) of the Home Node B Gateway (HNB-GW) transmits a control signal (Relocation Commit) to the radio network controller (IP-RNC). The control signal (Relocation Commit) indicates that the relocation is performed.

At step S851, the radio resource control signal processing unit (RRC) of the radio network controller (IP-RNC) transmits a confirmation signal (Cell Update Confirm) to the user equipment (UE). The confirmation signal (Cell Update Confirm) corresponds to the RRC message regarding the change of the setting of the communication paths.

At step S853, the radio resource control signal processing unit (RRC) of the user equipment (UE) transmits an acknowledgement signal (UTRAN Mobility Information Confirm) to the radio network controller (IP-RNC). The acknowledgement signal (UTRAN Mobility Information Confirm) corresponds to the change of the setting of the communication paths.

At step S857, the radio access network signal processing unit (RANAP) of the radio network controller (IP-RNC) transmits a control signal (Relocation Complete) to the switching center (MMS/xGSN). The control signal (Relocation Complete) indicates that the relocation is completed.

At step S859, the radio access network signal processing unit (RANAP) of the switching center (MMS/xGSN) transmits a command signal (Iu Release Command) to the Home Node B Gateway (HNB-GW). The command signal (Iu Release Command) is for commanding the release of the communication path for the Iu section.

At step S861, the radio access network signal processing unit (RANAP) of the Home Node B Gateway (HNB-GW) transmits an acknowledgement signal (Iu Release Complete) to the switching center (MMS/xGSN). The acknowledgement signal (Iu Release Complete) corresponds to the command signal.

In this manner, for the case of the modified example, the processes of steps S307, S319, S327, S329, and the like of FIG. 3 can be omitted. Accordingly, the modified example is preferable, from the viewpoint that the time period required for the handover can be shortened.

<<2.4 Incoming Sequence (Subscriber Line Extension)>>

Figure 10:
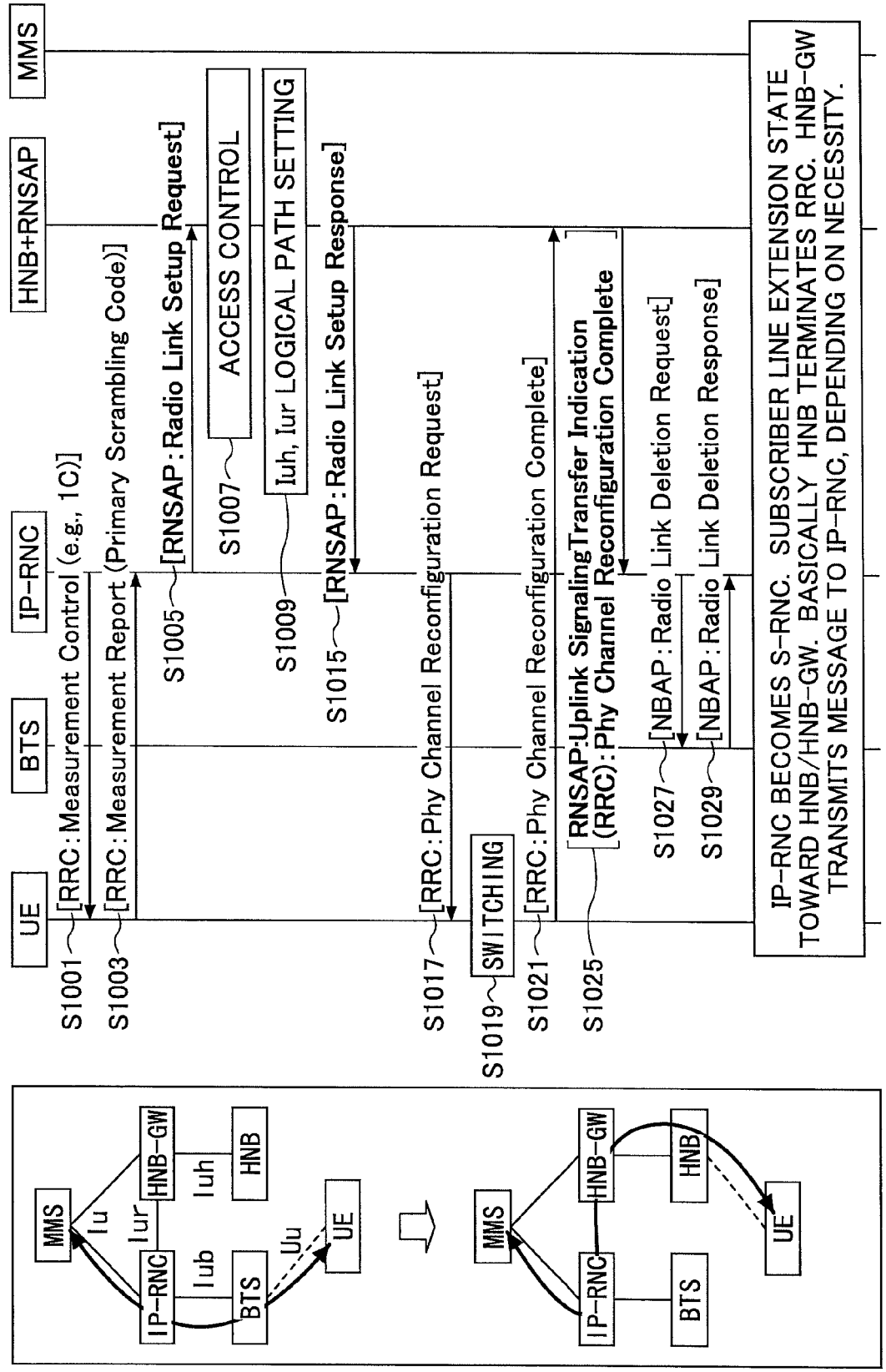
FIG. 10 is a diagram showing an operating sequence for performing the incoming handover (the subscriber line extension)

FIG. 10 shows an operating sequence for performing an incoming handover. The operating sequence shows operations, with which the user equipment (UE) being served in the macrocell is switched to the femtocell. The left side of the figure shows how the communication paths are switched. The right side of the figure shows the specific sequence. In general, the operations shown in FIG. 10 are the same as those of FIG. 5. Steps S5xx of FIG. 5 correspond to steps S10xx of FIG. 10.

At step S1001, the radio resource control signal processing unit (RRC) of the macro base station (BTS) transmits a measurement command signal (Measurement Control (e.g., 1C)) to the user equipment (UE). In response to the measurement command signal, the user equipment (UE) measures the reception levels, and the user equipment (UE) determines whether an event occurs.

At step S1003, the radio resource control signal processing unit (RRC) of the user equipment (UE) transmits a report signal or a measurement report signal (Measurement Report (Primary Scrambling Code)) including the measurement result and the determination result to the radio network controller (IP-RNC).

At step S1005, the radio network subsystem signal processing unit (RNSAP) of the radio network controller (IP-RNC) transmits a request signal (Radio Link Setup Request) to the Home Node B (HNB). The request signal (Radio Link Setup Request) is for requesting the establishment of the communication paths for the handover.

At step S1007, the Home Node B Gateway (HNB-GW) determines whether the user equipment (UE) is allowed to communication in the femtocell.

At step S1009, the bearers for the Iuh section and the Iur section are established, and the communication paths or the logical paths are established.

At step S1015, the radio network subsystem signal processing unit (RNSAP) of the Home Node B (HNB) transmits an acknowledgement signal (Radio Link Setup Response) to the radio network controller (IP-RNC). The acknowledgement signal (Radio Link Setup Response) indicates that the setting of the communication paths is completed.

At step S1017, the radio resource control signal processing unit (RRC) of the radio network controller (IP-RNC) transmits a command signal (Phy Channel Reconfiguration) to the user equipment (UE). The command signal (Phy Channel Reconfiguration) indicates that the communication paths are switched.

At step S1019, the user equipment (UE) switches the communication path.

At step S1021, the radio resource control signal processing unit (RRC) of the user equipment (UE) transmits an acknowledgement signal (Phy Channel Reconfiguration Complete) to the Home Node B (HNB). The acknowledgement signal (Phy Channel Reconfiguration Complete) indicates that the switching of the communication paths is completed.

At step S1025, the radio network subsystem signal processing unit (RNSAP) of the Home Node B (HNB) transmits a transfer signal (Uplink Signaling Transfer Indicator) to the radio network controller (IP-RNC). The transfer signal (Uplink Signaling Transfer Indicator) includes the RRC message.

At step S1027, the base station signal processing unit (NBAP) of the radio network controller (IP-RNC) transmits a command signal (Radio Link Deletion Request) to the macro base station (BTS). The command signal (Radio Link Deletion Request) is for commanding the release of the communication path for the Iub section.

At step S1029, the base station signal processing unit (NBAP) of the macro base station (BTS) transmits an acknowledgement signal (Radio Link Deletion Response) to the radio network controller (IP-RNC). The acknowledgement signal (Radio Link Deletion Response) corresponds to the command signal.

By doing this, the communication path for the Iub section is released, and the state shown in the lower-left part of FIG. 10 is achieved.

<<2.5 Incoming Sequence (Relocation)>>

Figure 11:
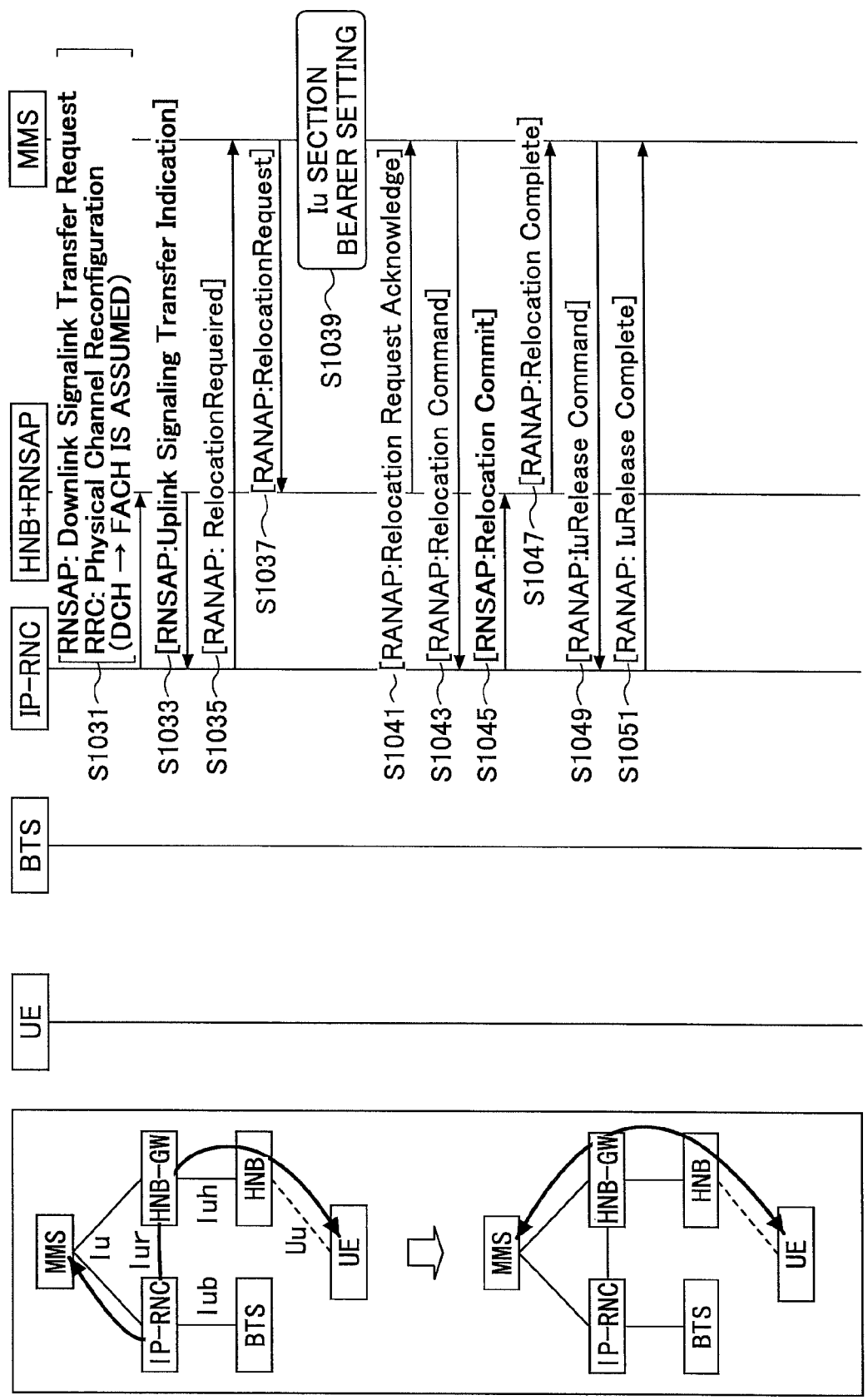
FIG. 11 is a diagram showing an operating sequence for performing the incoming handover (the relocation).

Referring to FIG. 11, there are explained operations for a case (a case of relocation) where the communication paths to the switching center are switched from the state of the subscriber line extension. In general, the operations to be explained are the same as those of FIG. 6. Steps S5xx in FIG. 6 correspond to steps S10xx in FIG. 11.

At step S1031, the radio network subsystem signal processing unit (RNSAP) of the radio network controller (IP-RNC) transmits a transfer signal (Downlink Signaling Transfer Request) to the Home Node B (HNB). The transfer signal (Downlink Signaling Transfer Request) includes an RRC message.

At step S1033, the radio network subsystem signal processing unit (RNSAP) of the Home Node B (HNB) transmits a transfer signal (Uplink Signaling Transfer Indication) to the radio network controller (IP-RNC). The transfer signal (Uplink Signaling Transfer Indication) includes an acknowledgement signal.

At step S1035, the radio access network signal processing unit (RANAP) of the radio network controller (IP-RNC) transmits a request signal (Relocation Required) to the switching center (MMS/xGSN). The request signal (Relocation Required) is for requesting the relocation.

At step S1037, the radio access network signal processing unit (RANAP) of the switching center (MMS/xGSN) transmits a request signal (Relocation Request) to the Home Node B (HNB). The request signal (Relocation Request) is for requesting the relocation.

At step S1039, the bearer for the Iu section is established, and the communication path or the logical path is established for the Iu interface.

At step S1041, the radio access network signal processing unit (RANAP) of the Home Node B (HNB) transmits an acknowledgement signal (Relocation Request Acknowledge) to the switching center (MMS/xGSN). The acknowledgement signal (Relocation Request Acknowledge) corresponds to the request signal of the relocation.

At step S1043, the radio access network signal processing unit (RANAP) of the switching center transmits a request signal (Relocation Command) to the radio network controller (IP-RNC). The request signal (Relocation Command) is for actually transferring the control.

At step S1045, the radio network subsystem signal processing unit (RNSAP) of the radio network controller (IP-RNC) transmits a control signal (Relocation Commit) to the Home Node B (HNB). The control signal (Relocation Commit) indicates that the relocation is performed.

At step S1047, the radio access network signal processing unit (RANAP) of the Home Node B (HNB) transmits a control signal (Relocation Complete) to the switching center (MMS/xGSN). The control signal (Relocation Complete) indicates that the relocation is completed.

At step S1049, the radio access network signal processing unit (RANAP) of the switching center (MMS/xGSN) transmits a command signal (Iu Release Command) to the radio network controller (IP-RNC). The command signal (Iu Release Command) is for commanding the release of the communication path for the Iu section.

At step S1051, the radio access network signal processing unit (RANAP) of the radio network controller (IP-RNC) transmits an acknowledgement signal (Iu Release Complete) to the switching center (MMS/xGSN). The acknowledgement signal (Iu Release Complete) corresponds to the command signal.

By doing this, the state shown in the lower-left part of FIG. 11 is achieved.

According to the embodiment, the load to the core node can be significantly reduced for performing the mobility control between the macrocell and the femtocell.

Hereinabove, the present invention is explained by referring to the specific embodiments. However, the embodiments are merely illustrative, and variations, modifications, alterations, and substitutions could be conceived by those skilled in the art. For example, the present invention may be applied to any suitable mobile communication system, in which macrocells and femtocells coexist. For example, the present invention may be applied to a W-CDMA system; an HSDPA/HSUPA based W-CDMA system; an LTE system; an LTE-Advanced system; an IMT-Advanced system, a WiMAX system, and a Wi-Fi system. Specific examples of numerical values are used in order to facilitate understanding of the invention. However, these numerical values are simply illustrative, and any other appropriate values may be used, except as indicated otherwise. The separations of the embodiments or the items are not essential to the present invention. Depending on necessity, subject matter described in two or more items may be combined and used, and subject matter described in an item may be applied to subject matter described in another item (provided that they do not contradict). For the convenience of explanation, the devices according to the embodiments of the present invention are explained by using functional block diagrams. However, these devices may be implemented in hardware, software, or combinations thereof. The software may be prepared in any appropriate storing medium, such as a random access memory (RAM), a flash memory, a read-only memory (ROM), an EPROM, an EEPROM, a register, a hard disk drive (HDD), a removable disk, a CD-ROM, a database, a server, and the like. The present invention is not limited to the above-described embodiments, and various variations, modifications, alterations, substitutions and so on are included, without departing from the spirit of the present invention.

The present application claims priority based on Japanese Patent Application No. 2010-280693, filed on Dec. 16, 2010, the entire contents of which are hereby incorporated by reference.

LIST OF REFERENCE SYMBOLS

UE: User equipment
BTS: Macro base station
IP-RNC: Radio network controller
MMS/xGSN: Switching center
HNB: Home Node B
HNB-GW: Home Node B Gateway

The invention claimed is:

1. A radio access device that functions as a Home Node B Gateway, the Home Node B Gateway being a first upper layer node of a Home Node B of a femtocell, and that performs mobility control for causing user equipment to perform a handover to a macrocell, the user equipment being served by the femtocell,
the radio access device comprising:
a controller signal processing unit that is a radio network subsystem signal processing unit (RNSAP) included in the Home Node B Gateway, wherein the processing unit processes a controller signal exchanged with a radio network controller through an interface between the radio network controller and the radio access device, the radio network controller being a second upper layer node of a macro base station of the macrocell; and
a switching center signal processing unit that processes a switching center signal exchanged with a switching center, the switching center being a third upper layer node of the radio network controller,
wherein the controller and switching center signals are processed during the handover to the macrocell,
wherein the controller signal processing unit requests to establish a first communication path between the radio access device and the radio network controller and a second communication path between the radio network controller and the macro base station by transmitting a first request signal to the radio network controller,
wherein, subsequent to the controller signal processing unit receiving a first acknowledgement signal corresponding to the first request signal from the radio network controller,
the switching center signal processing unit requests to establish a third communication path between the switching center and the radio network controller by transmitting a second request signal to the switching center, and
wherein, subsequent to the switching center processing unit receiving a second acknowledgement signal corresponding to the second request signal from the switching center, a fourth communication path between the radio access device and the switching center is released.

2. The radio access device according to claim 1, wherein the radio access device functions as the Home Node B of the femtocell.

3. A handover method of a radio access device that functions as a Home Node B Gateway, the Home Node B Gateway being a first upper layer node of a Home Node B of a femtocell, and that performs mobility control for causing user equipment to perform a handover to a macrocell, the user equipment being served by the femtocell, the radio access device comprising:
a controller signal processing unit that is a radio network subsystem signal processing unit (RNSAP) included in the Home Node B Gateway and that processes a controller signal exchanged with a radio network controller through an interface between the radio network controller and the radio access device, the radio network controller being a first second upper layer node of a macro base station of the macrocell; and
a switching center signal processing unit that processes a switching center signal exchanged with a switching center, the switching center being a third upper layer node of the radio network controller, wherein the controller and switching center signals are processed during the handover to the macrocell,
wherein the handover method includes steps such that the controller signal processing unit requests to establish a first communication path between the radio access device and the radio network controller and a second communication path between the radio network controller and the macro base station by transmitting a first request signal to the radio network controller,
wherein, subsequent to the controller signal processing unit receiving a first acknowledgement signal corresponding to the first request signal from the radio network controller, the switching center signal processing unit requests to establish a third communication path between the switching center and the radio network controller by transmitting a second request signal to the switching center, and
wherein, subsequent to the switching center processing unit receiving a second acknowledgement signal corresponding to the second request signal from the switching center, a fourth communication path between the radio access device and the switching center is released.

* * * * *